ROTARY SOLENOID HAVING A STEPPED OUTPUT

Original Filed Nov. 6, 1961 3 Sheets-Sheet 1

INVENTOR.
Arvid A. Molitor,
BY Parker & Carter
Attorneys.

ROTARY SOLENOID HAVING A STEPPED OUTPUT

Original Filed Nov. 6, 1961 3 Sheets-Sheet 2

INVENTOR.
Arvid A. Molitor,
BY Parker & Carter
Attorneys.

ROTARY SOLENOID HAVING A STEPPED OUTPUT

Original Filed Nov. 6, 1961 3 Sheets-Sheet 3

INVENTOR.
Arvid A. Molitor
BY Parker & Carter
Attorneys.

United States Patent Office

Re. 25,992
Reissued Mar. 22, 1966

25,992
ROTARY SOLENOID HAVING A STEPPED OUTPUT

Arvid A. Molitor, 1136 Morningside Drive, Elgin, Ill.

Original No. 3,164,732, dated Jan. 5, 1965, Ser. No. 150,240, Nov. 6, 1961. Application for reissue July 12, 1965, Ser. No. 475,038
5 Claims. (Cl. 310—37)

Matter enclosed in heavy brackets [ ] appears in the original patent but forms no part of this reissue specification; matter printed in italics indicates the additions made by reissue.

This invention relates to a rotary solenoid, and is a continuation in part of my copending application, Serial No. 104,112, filed April 19, 1961, now abandoned.

A primary purpose of this invention is a rotary solenoid in which substantially all of the magnetic force produced is a turning force.

Another purpose is a rotary solenoid of the type described in which the bearings have no axial load.

Another purpose is a rotary solenoid in which the length of travel of the armature may be easily varied.

Another purpose is a rotary solenoid of the type described in which the armature may move through a distance substantially greater than possible heretofore.

Another purpose is a rotary solenoid of the type described which may be arranged for either an on-and-off type movement or a step-by-step type movement.

Another purpose is an improved and compact rotary solenoid which may be simply and economically manufactured.

Other purposes will appear in the ensuing specification, drawings and claims.

The invention is illustrated diagrammatically in the following drawings wherein.

Figure 3:
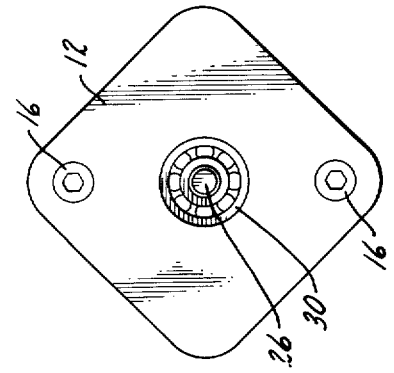
Figure 6:
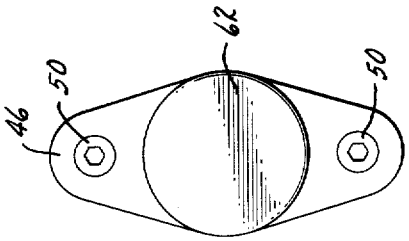
Figure 2:
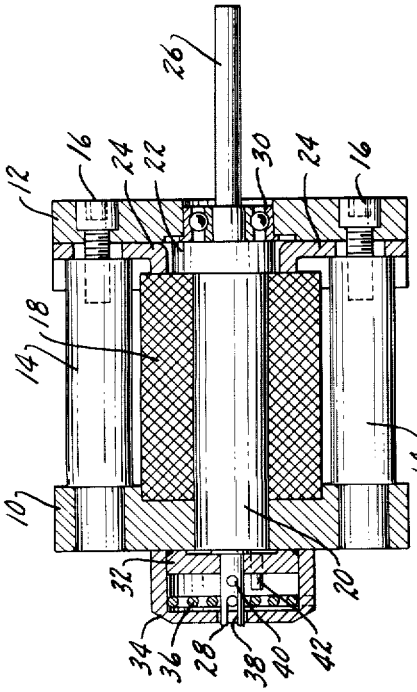
FIGURE 2 is a section along plane 2—2 of FIGURE 1.
Figure 5:
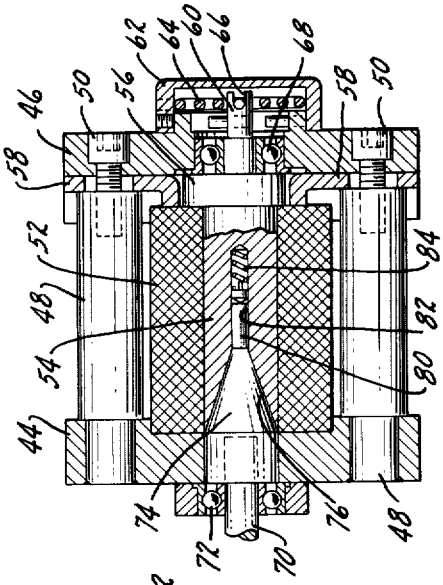
Figure 1:
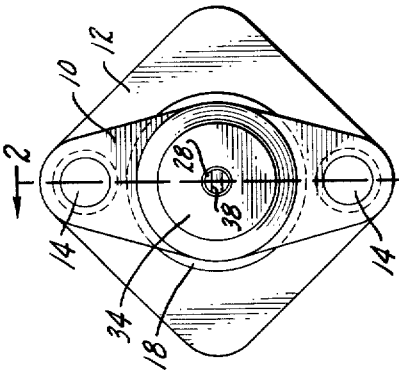
FIGURE 1 is an end view of one form of rotary solenoid.
Figure 4:
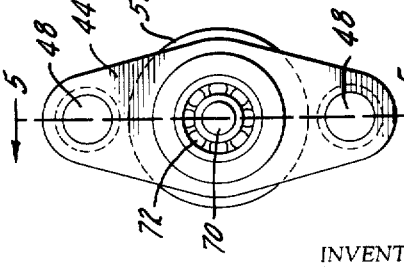
Figure 8:
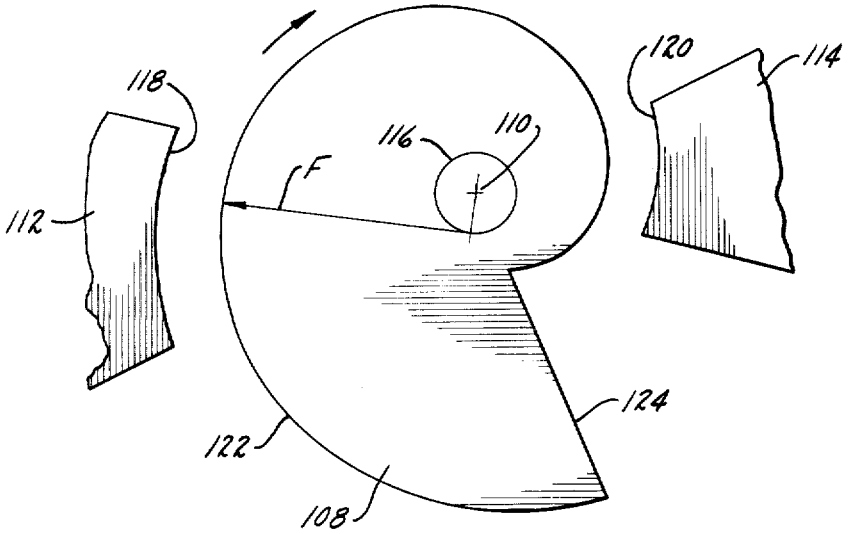
Figure 7:
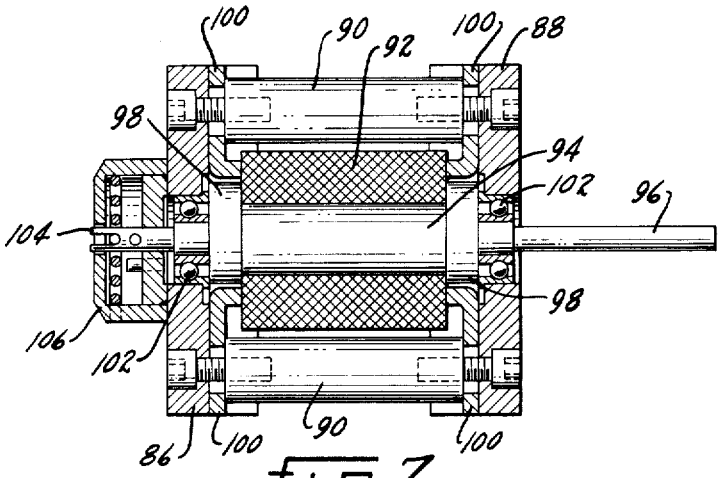
Figure 10:
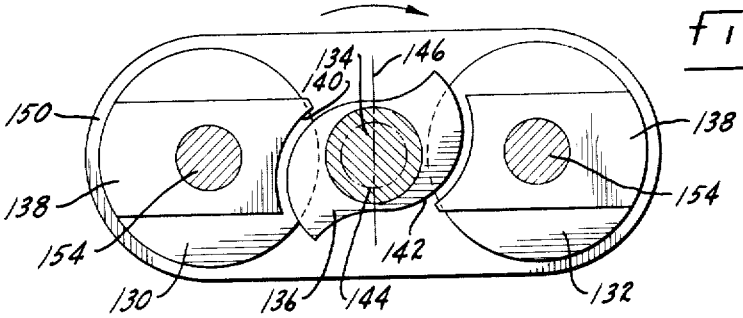
Figure 9:
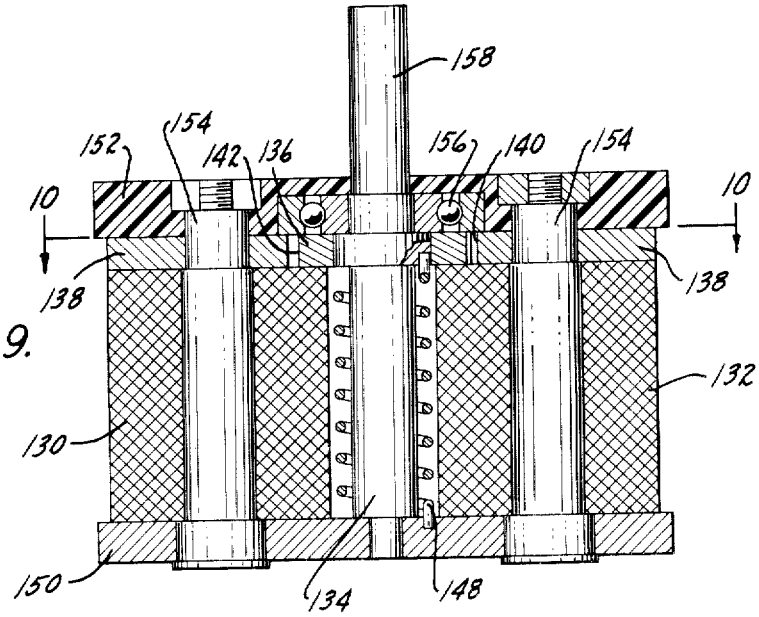
Figure 11:
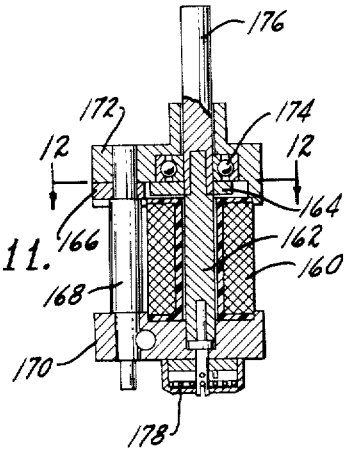
Figure 12:
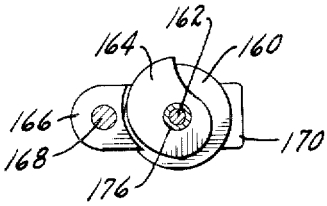

FIGURE 3 is an end view, from the right side, of the solenoid shown in FIGURES 1 and 2, FIGURE 4 is an end view of another form of rotary solenoid, FIGURE 5 is a section along plane 5—5 of FIGURE 4, FIGURE 6 is a right end view of the solenoid shown in FIGURES 4 and 5, FIGURE 7 is an axial section, similar to FIGURES 2 and 5, showing a further form of rotary solenoid, FIGURE 8 is a plan view of an armature and pole piece arrangement which may be used in the solenoids shown, FIGURE 9 is an axial section showing a modified form of rotary solenoid, FIGURE 10 is a section along plane 10—10 of FIGURE 9, FIGURE 11 is an axial section of yet a further form of rotary solenoid, and FIGURE 12 is a section along plane 12—12 of FIGURE 11.

Considering the form of solenoid shown in FIGURES 1, 2 and 3, end plates 10 and 12 may be held together by suitable support pins 14. End plate 10 and the support pins should be formed of a suitable magnetic material. Cap screws or the like 16 may be used to hold the end plate 12 to the pins 14.

Mounted within the solenoid housing formed by the end plates 10 and 12 and the pins 14 is a suitable magnetic coil 18 which encircles a core 20. The core 20 has a portion, which will be called the armature and which is designated at 22, positioned between a pair of pole pieces or segments 24. The armature 22 and the pole pieces 24 are in general radial alignment. The particular configuration of the armature and the pole pieces which are used to move the armature will be described in detail hereinafter. Forming a portion of or rigidly secured to the core 20 is an output shaft 26. The opposite end of the core 20 carries a shaft 28 which cooperates with a spring arrangement to move the armature and core in one direction. A bearing 30 adjacent the output shaft 26 and a second bearing 32 adjacent the shaft 28 rotatably support the core and armature within the housing.

Mounted on the plate 10 is a cover 34 which houses a suitable coiled spring 36. One end of the spring may be inserted in a slot 38 in the shaft 28 and the other end of the spring may be suitably secured to the cover 34. A stop pin or the like 40 may be mounted on the shaft 28 and is positioned to strike a pin 42 projecting outwardly from the cover plate 10 after the core and armature have moved through a predetermined angular distance. The stop pin arrangement could be used when the armature opens and there may be a stop pin for both opening and closing.

The operation of the solenoid shown in FIGURES 1, 2 and 3, as well as the operation of the solenoids shown in the other figures, will be described in conjunction with FIGURE 8, as this figure illustrates the principle upon which these solenoids operate. For the present, when the coil 18 is energized, the core and armature will rotate within the coil until stop pin 40 strikes the pin 42. In the alternative, the armature and core may move until the armature contacts the pole pieces. The armature and core will be held in the energized position until current to the coil 18 is cut off. At that time, the spring 36 will move the core and amature back to their original position.

In FIGURES 4, 5 and 6, end plates 44 and 46 are held together by suitable pins 48. Plate 44 and the pins 48 should all be formed of a suitable magnetic material. Cap screws or the like 50 may be used to hold plate 46 to the pins 48. Mounted within the general housing outlined by the plates 44 and 46 and the pins 48 is a coil 52 which encircles a core 54. The core 54 has an armature portion 56, which preferably is in radial alignment with a pair of pole pieces or segments 58.

The armature 56 may have an outwardly projecting shaft 60 extending within a cover 62 mounted on end plate 46. Within the cover is a coiled spring 64 which functions in a manner similar to the spring 36 in the form shown in FIGURES 1, 2 and 3. One end of the spring is positioned within a slot 66 in the end of shaft 60 and the other end of the spring is suitably connected to the cover 62. A bearing 68 mounts the shaft 60 and the core and armature for rotation within the housing.

At the opposite end of the solenoid is an output shaft 70. The shaft 70 is mounted within a bearing 72 and carries a generally cone-shaped clutch member 74 at its inward end. The clutch member 74 fits within a mating cone-shaped recess 76 formed at the end of the core member 54. Although it cannot be seen in FIGURE 5, in the deenergized position, there is a small air gap between the clutch member and the core. The clutch member 74 has an exially extending non-magnetic pin 80 which is positioned with a bore 82 in the core 54. A suitable spring 84 is also positioned within the bore 82 and normally biases the clutch member 76 away from the core, or toward the left, as shown in FIGURE 5. The clutch member will be biased away from the core by the spring and will be held in this position as long as the solenoid is deenergized.

When the solenoid is energized, the clutch member 74 will be drawn into the recess 76 and will be held against the core. The core will rotate due to the magnetic field between the pole pieces and armature, and the clutch member and output shaft 70 will rotate with it. When the solenoid is deenergized, the clutch member will be released by the spring 84 and at the same time the armature and core will be rotated back to their original position by the spring 64. The output shaft 70 will not rotate. When the solenoid is next energized, the same sequence of operation is followed and the output shaft 70 will again be moved in the same direction. In this way, the output shaft 70 will be moved in one direction in a step-by-step manner.

FIGURE 7 illustrates a solenoid much like that shown in FIGURES 1–3 with the addition of a second armature and pair of pole pieces. End plates 86 and 88, both non-magnetic, are held together by suitable pins 90, with the pins being formed of a suitable magnetic material. A coil 92, mounted within the solenoid housing, encircles a core 94 having an output shaft 96. Each end of the core has armature portions 98 which are in general radial alignment with pole pieces or segments 100. Bearings 102 mount the armatures and core for rotation within the coil. The core and armaments may have a second shaft 104 which extends within an outer cover 106. The cover 106 encloses a spring arrangement substantially identical with that shown in FIGURE 2.

The solenoid shown in FIGURE 7 operates substantially the same as that shown in FIGURES 1–3. However, in this case, there are armatures and pole pieces at each end of the core to provide the turning torque. When the non-working air gap required for clearance becomes large relative to the required working gap between the spiral surfaces, it is advantageous to provide an armature at each end of the core.

The principle of operation utilized in the solenoid shown in FIGURES 1–7 is illustrated in FIGURE 8. An armature 108 rotates about an axis 110 between a pair of generally equally spaced segments or pole pieces 112 and 114. The armature has an outer spiral surface which is preferably the involute of circle 116. The lead of the spiral may vary and will determine, at least in part, the length of travel of the armature when the coil is energized. The pole pieces 112 and 114 each have a spiral surface 118 and 120 respectively, which are positioned opposite or directly across from the spiral surface 122 of the armature. The armature and the pole pieces are all in the same general plane or are in radial alignment. Preferably, the lead per revolution of the surfaces 118 and 120 is the same as the lead on the armature spiral surface. In this way, the armature may turn through a predetermined distance until there is complete engagement between opposing surfaces on the armature and the pole pieces. Although the lead of both the armature and the pole pieces may vary, the lead preferably is equal to the circumference of the circle 116. When the lead changes, the radius of this circle will also change.

The direction of the force of attraction between the armature and pole pieces will be perpendicular to the surface 122 of the armature at each increment along the surface. An infinite number of force lines may be drawn which are each normal to the outer surface of the armature. Each of the force lines F will be tangent to the circle 116, and cooperate with a radius of this circle to form a moment arm about the axis of rotation. This provides the torque which turns the armature. With a given magnetomotive force, the torque is equal to the force of a flat faced magnet having the same dimensions times the radius of the involute circle.

Because the spiral surface of the armature and the spiral surfaces of the pole pieces may have the same lead, the surfaces will come in complete contact after the armature has turned a predetermined angular distance. As shown in FIGURE 8, this distance is approximately 90 degrees. The particular lead will determine the distance which the armature moves as will the initial positioning of the armature relative to the pole pieces. If, for example, that portion of the armature having the greatest radius, indicated at 124, is moved to a position where it is close to pole piece 114, there will be greater armature travel, but more counter-flux because of the proximity of pole piece 114 and the larger part of the armature. Accordingly, there is an optimum range of armature positions and leads which can be used in order to reduce the leakage flux or counter-force to a minimum and yet provide sufficient armature travel.

FIGURES 9 and 10 illustrate a solenoid including a pair of coils 130 and 132 which are on opposite sides of a shaft 134. The shaft includes an armature portion 136 in general radial alignment with a pair of pole pieces or segments 138. The surfaces 140 on the pole pieces in opposition to the armature are spiral, and preferably involute spiral surfaces as described before. The armature 136 has generally similar halves 142, each of which is a portion of the involute circle 144. Rather than using an armature which is formed on the involute of circle 144, two identical halves or lobes, each including the major portion of an involute, such as shown in FIGURE 8, are positioned together along the axis 146 of the circle 144. Preferably, the spiral surfaces of the armature 142 have portions identical with the spiral surfaces 140 on the pole pieces 138. The advantages of the arrangement shown in FIGURES 9 and 10 are similar to the advantages discussed in conjunction with FIGURE 8. However, the double lobe arrangement of FIGURES 9 and 10 generally has a stroke or travel shorter than the armature arrangement of FIGURE 8 and has higher torque.

A coil spring 148 may surround the shaft 134 and is used to return the armature to its original position. The solenoid is completed by an end plate 150, formed of a magnetic material and an end plate 152 formed of a non-magnetic material. Suitable cores or the like 154 passing through the coils 130 may be used to hold the solenoid together. Bearing 156 mounts the shaft 134, armature and the output shaft portion 158 for rotation within the solenoid.

The theory of operation for the double lobe arrangement is the same as described in connection with the involute of FIGURE 8. All of the lines of force will be tangent to circle 144.

It should be noted that each of the lobes illustrated in FIGURES 9 and 10 do not have a straight section from the largest radius back towards the smallest radius as illustrated in FIGURE 8. It is desirable to form the line from the largest radius to the smallest radius on a curve to enlarge the air gap between the largest portion of the armature and the non-working pole piece for that portion of the armature. This reduces the counter-flux.

FIGURES 11 and 12 illustrate yet a further form of solenoid in which there is only a single pole piece. A magnetic coil 160 encloses a core 162 having an armature portion 164 at one end. The armature may be formed on an involute as was described before. A pole piece 166 may be held in place by a suitable pin 168 which holds the cover plates 170 and 172 in position. Cover plate 170 should be formed of a magnetic material and cover plate 172 should be formed of a non-magnetic material. A suitable bearing 174 may mount the core, armature and output shaft 176 for rotation within the coil. A suitable spring 178 may be used to return the armature to an original position. Although the coil is shown as surrounding the core, in the alternative, the coil may encircle pin 168. Either form is satisfactory.

The solenoid shown in FIGURES 11 and 12 is very compact and may be used where a large stroke is desired. The disadvantage of this type of solenoid is that there is some radial load on the bearings.

Although the armature and pole piece spirals have been described as being the involute of a circle, and this arrangement has been found to be extremely advantageous, the invention should not be limited thereto, as other spiral configurations may also be satisfactory.

The use, operation and function of the invention are as follows:

Considering first the form of the invention in FIGURES 1, 2 and 3, when the coil is energized, the armature 22 and the core 20 will move until the spiral outer surface of the armature contacts the spirally shaped pole pieces 24 or until pin 42 contacts pin 49. The operation may vary and it is not necessary to have the spiral surfaces in engagement. Once the coil 18 is deenergized, the spring 36 will move the armature and core back to their original position. Thus, the type of solenoid shown in FIGURES 1, 2 and 3 is a single step or oscillating solenoid. The armature and pole pieces of the solenoid in these figures, as well as the solenoids in FIGURES 4–7, may be the same as that illustrated in FIGURE 8.

The solenoid of FIGURES 4, 5 and 6 operates substantially in the same manner except that when the coil 52 is energized the clutch member 74 will be pulled into contact with the core 54. These two members will be held together by the magnetic force of attraction as the core and armature move. When the coil 52 is deenergized, the clutch member will be pushed outward and the output shaft 70 will not move. The core, however, will be turned back to its original position by the spring 64. This form of solenoid is a step-by-step type of solenoid.

The solenoid of FIGURE 7 operates in substantially the same manner as the structure in FIGURES 1, 2 and 3. The addition of a second armature and the corresponding pole piece may provide additional torque where there is provision for additional coil area or for heavy current.

The solenoids in FIGURES 9–12 operate in the same manner as the solenoids of FIGURES 1–3 and 7. However, either of these solenoids could be equipped for step-by-step operation by the addition of a clutching arrangement such as shown in FIGURES 4–6.

Of particular advantage in the spiral arrangement shown is the fact that the load on all of the bearings is substantially reduced. This is very important in miniature solenoids. In prior types of rotary solenoids, there was an axial load on the bearings. There is no axial load in the present solenoid as all of the magnetic force components producing rotation are substantially in the same plane or are in radial alignment. In addition, the radial forces or the radial components of the turning force will tend to cancel each other as they are in opposition. The lines of force, which are normal to the opposing armature and pole piece surfaces, are each tangent to circle 116 or to circle 144. These forces will tend to rotate the armature about its axis of rotation, but the radial component of each of these forces will cancel each other, leaving only the turning force. This is particularly true if the pole pieces have equivalent cross-sectional areas opposing the armature. If the areas are unequal, for example as in FIGURE 8, there may be some radial thrust on the bearings. When two armatures are used, as in FIGURE 7, the armatures may each have the same position relative to their pole pieces, but the armatures may be positioned 180 degrees apart to balance the armature to withstand high vibration. Another way to balance the radial load is bevel the sides or ends of the pole pieces so that the cross-sectional areas are equal. The invention is not limited to only two pole pieces or segments, for example, four pole pieces or segments would also work, although in this case the length of travel of the armature would be substantially reduced.

It is preferred to have defined segments for the pole pieces rather than a pole piece which extends through 360 degrees as the latter arrangement has a substantial amount of leakage flux and, accordingly, less torque for the same input. In addition to having defined segments, it is desirable that the cross-sectional areas of both pole piece faces be related to the cross-sectional area of the core. Nearly all of the flux moves through the core but there is less at the pole pieces. Consequently, the area of the pole pieces may have to be increased proportionally.

The present invention is particularly useful where the length of travel is more than a few degrees, although the length of travel will vary, depending upon the lead of the spiral and upon the initial position of the armature relative to the pole pieces.

An additional advantage of the present invention, particularly when used for a relay, is the fact that with increased travel there are no minute adjustments of contacts in assembly as in many presently used relay magnets where travel is minute.

A further modification of the invention is to use a permanent magnet to hold the armature and pole pieces in the closed position and to use the combination of a coiled spring and a magnetic coil to move the armature to an open position. The coil may be so arranged that the magnetic flux produced will counter the magnetic flux from the permanent magnet.

Whereas the preferred form of the invention has been shown and described herein, it should be realized that there are many modifications, substitutions and alteration thereto within the scope of the following claims.

I claim:

1. A rotary solenoid including a rotary core and a pair of pole pieces, concentric with the core, and circumferentially spaced, one from the other, the core having an armature portion positioned between and in general rarial alignment with the pole pieces, said armature portion having spiral-like outer surfaces positioned opposite said pole pieces, said pole pieces each having spiral-like surfaces positioned opposite the spiral-like surfaces on the armature, a magnetic coil positioned to form a magnetic field between the pole pieces and armature and to rotate the armature within the pole pieces with the spiral-like surfaces on the armature moving, in one direction, toward engagement with the spiral-like surfaces of both pole pieces, a spring arranged to move said armature in the opposite direction, an output shaft, a clutch effective to connect said output shaft to said core when the coil is energized and to disengage said shaft when the coil is deenergized so that said output shaft only rotates in one direction.

2. The structure of claim 1 further characterized in that said clutch includes a clutch member positioned to move into contact with said core and to rotate therewith when said coil is energized, and a spring normally biasing said clutch member away from said core.

3. The structure of claim 2 further characterized in that said clutch member is generally cone shaped and said core has a mating generally cone-shaped recess, said spring normally biasing said clutch member out of said recess to form an air gap between the recess and clutch member, said clutch member moving into engagement with said core when said coil is energized.

4. The structure of claim 1 further characterized in that said clutch includes a recess in said core and a clutch member positioned in said recess, said clutch member moving into driving contact with said core when said coil is energized.

*5. A rotary solenoid including a rotary armature and at least one pole piece concentric with and in general radial alignment with the armature, said armature having a curved outer surface positioned opposite said pole piece, said pole piece having a curved surface positioned opposite the curved surface on the armature, a magnetic coil positioned to form a magnetic field between the pole piece and armature and to rotate the armature within the pole piece with the curved surface on the armature moving, in one direction, toward engagement with the curved surface on the pole piece, a spring arranged to move said armature in the opposite direction, an output shaft, a magnetic clutch effective to connect said output shaft to said armature when the coil is energized and to disengage said shaft from the armature when the coil is deenergized so that said output shaft only rotates in one direction.*

References Cited by the Examiner

The following references, cited by the Examiner, are of record in the patented file of this patent or the original patent.

UNITED STATES PATENTS

| | | | |
|---|---|---|---|
| 2,460,921 | 2/1949 | Candy | 200—873 |
| 2,987,657 | 6/1961 | Buchtenkirch et al. | 317—192 |

MILTON O. HIRSHFIELD, *Primary Examiner.*

JOHN T. BURNS, *Examiner.*

G. HARRIS, C. W. DAWSON, *Assistant Examiners.*